(12) United States Patent
Matsuoka et al.

(10) Patent No.: US 7,027,927 B2
(45) Date of Patent: Apr. 11, 2006

(54) METHODS FOR DETERMINING FORMATION AND BOREHOLE PARAMETERS USING FRESNEL VOLUME TOMOGRAPHY

(75) Inventors: Toshifumi Matsuoka, Osaka (JP); Takeshi Endo, Sagamihara (JP); Di Cao, Yokohama (JP); Nicholas Banchet, Paris (FR); Jongha Lee, Kyoto (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 58 days.

(21) Appl. No.: 10/328,309

(22) Filed: Dec. 23, 2002

(65) Prior Publication Data

US 2004/0122594 A1 Jun. 24, 2004

(51) Int. Cl.
   *G01V 1/48* (2006.01)

(52) U.S. Cl. ........................................ 702/11
(58) Field of Classification Search ............ 702/6, 702/11, 14, 17
See application file for complete search history.

(56) References Cited

U.S. PATENT DOCUMENTS 5,062,086 A   10/1991 Harlan et al.
5,081,611 A    1/1992 Hornby

OTHER PUBLICATIONS

Watanabe, Toshiki, et al., "Seismic Traveltime Tomography Using Fresnel Volume Approach", Expanded Abstracts of 69th SEG Annual Meeting, SPRO12.5, 1999, 4 pages.*

Watanabe, Toshiki, et al., "Seismic Tomography By Use Of Fresnel Volumes", Proceedings of the 4th SEGJ International Symposium—Fracture Imaging, pp. 123–128, 1998, (Abstract only)..*

Toshiki Watanabe, Masamichi Fujimoto and Yuzuru Ashida, "Seismic tomography by use of Fresnel volumes", Proc. of the 4th SEGJ Int'l Symp., pp. 123–128, Dec. 1998.

Vidale, J., "Finite–Difference Calculation of Travel Times", Bulletin of the Seismological Soc. of America, vol. 76, No. 6 pp. 2062–2076, 1988.

Matsuoka, T., "Forward Modeling for Ray Tomography", Proc. 1st SEGJ Int'l Symposium on Geotomography, pp. 148–156, 1990.

Kvasnicka, M., Cerveny, V., "Fresnel Volumes and Fresnel Zones in Complex Laterally Varying Structures", Journal of Seismic Exploration 3, pp. 215–230, 1994.

Nurhandoko, B.E.B., Matsuoka, T., Watanabe, T. Ashida, Y., "Land seismic refraction tomography using homogeneous velocity as initial model", SEG 1999 Expanded Abstracts, pp. 1481–1484, 1999.

Watanabe, T., Matsuoka, T., Ashida, Y., "Seismic traveltime tomography using Fresnel volume approach", SEG 1999 Expanded Abstracts, pp. 1402–1405, 1999.

Cerveny, V., Soares, J.E.P., "Fresnel volume ray tracing", Gelphysics, Bol. 57, No. 7, pp. 902–915, 1992.

(Continued)

*Primary Examiner*—Donald McElheny, Jr.
(74) *Attorney, Agent, or Firm*—William L. Wang; Brigette Echols; John Ryberg

(57) ABSTRACT

A method and apparatus for determining formation slowness around a borehole are provided. The Fresnel volume concept is applied for traveltime tomography. The Fresnel volume represents a sonic wave propagation path about the borehole. The application of Fresnel volume to sonic data provides for a stable inversion and makes practical 3-D tomography. Inversion is accomplished by an iterative back-projection method.

42 Claims, 7 Drawing Sheets

OTHER PUBLICATIONS

Matsuoka, T., Ezaka, T., "Ray tracing using reciprocity", Geophysics, vol. 57, No. 2, pp. 326–333, 1992.

Kimball, C.V., Marzetta, T.L., "Semblance processing of borehole acoustic array data", Geophysics, vol. 49, No. 3, pp. 247–281, 1984.

P. M. Soupios, C. B. Papazchos, C. Juhlin, G.N. Tsokas, "Nonlinear 3–D traveltime inversion of crosshole data with an application in the area of the Middle Ural Mountains", Gelphys. vol. 66, No. 2 pp. 627–636.

A.M. Popovici, J.A. Sethian, "3–D imaging using higher order fast marching traveltimes", Gelphys. vol. 67, No. 2, pp. 604–609.

J.A. Sethian, A.M. Popovici, "3–D traveltime computation using the fast marching method", Geophys. vol. 64, No. 2, pp. 516–523.

* cited by examiner

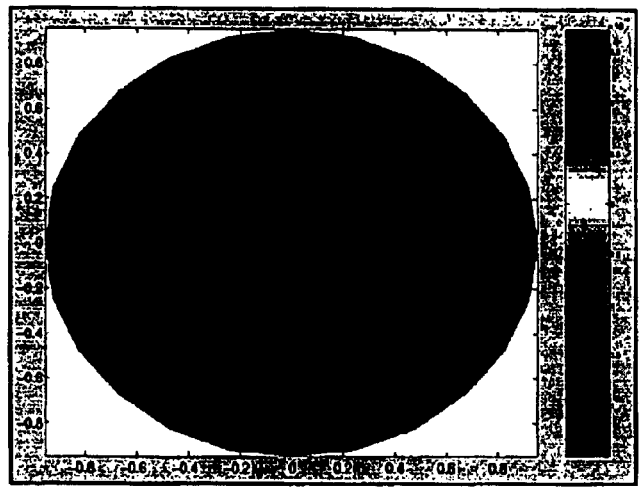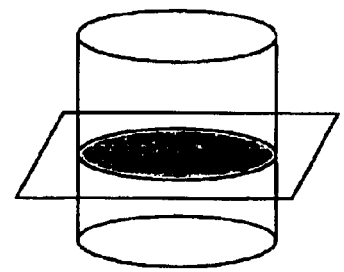
FIG. 6a - Slowness Field to be reconstructed in a plane taken in the middle of the cylinder
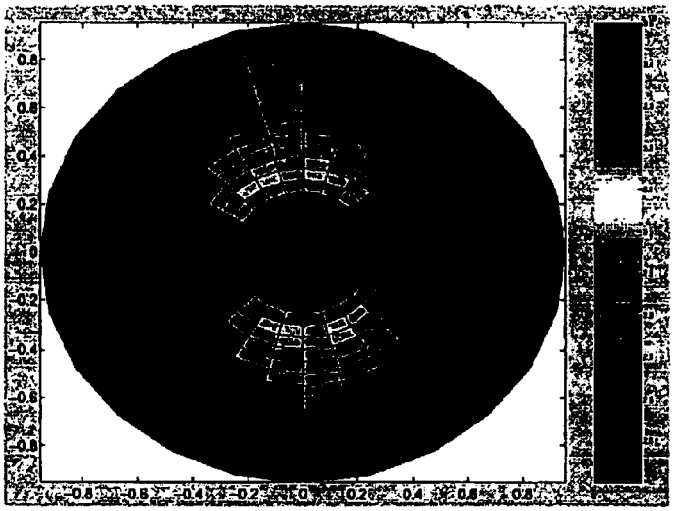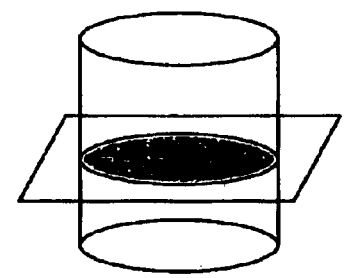
FIG. 6b - Reconstructed Slowness field in the same horizontal plane.

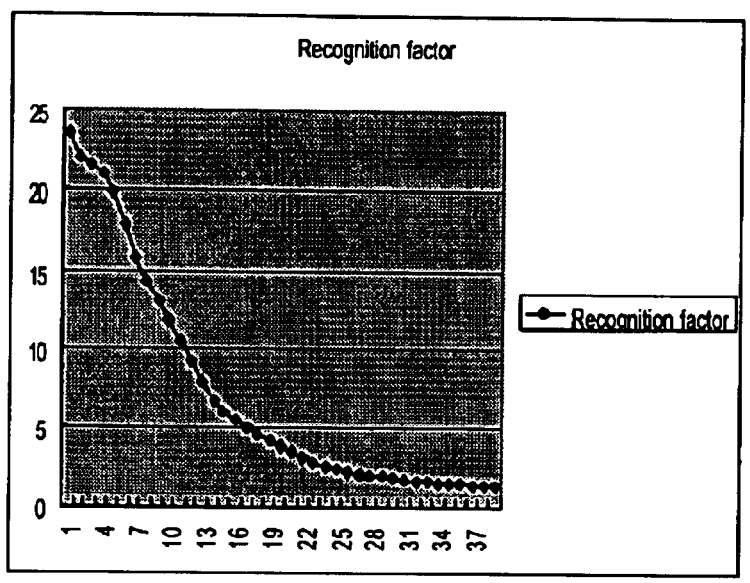
FIG. 6C - Variations of the percentage difference between observed traveltime on the hypothetical slowness field and traveltimes computed on the reconstructed slowness field.

METHODS FOR DETERMINING FORMATION AND BOREHOLE PARAMETERS USING FRESNEL VOLUME TOMOGRAPHY

FIELD OF THE INVENTION

The present invention relates generally to methods for investigating subsurface formations using sonic measurements made in a borehole. More particularly, this invention is directed to methods for determining formation slowness along and around a borehole.

BACKGROUND OF THE INVENTION

The generation and recording of borehole acoustic waves is a key measurement employed in oilfield wireline logging. Many borehole tools and methods are currently available for taking acoustic measurements. Some tools include a single source of sonic waves and two or more receivers; however, most of the tools now include many receivers arranged in an array. While the currently available acoustic tools are useful in providing a large range of information regarding the adjacent formation and the borehole parameters, a primary use of acoustic borehole measurements is the estimation of compressional wave formation slowness.

Compressional wave formation slowness is typically estimated using travel times acquired via a first motion detection process. In the case of a single source, two receiver tool suggested by the prior art, formation slowness is estimated by subtracting the arrival times between two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) among others have been used to reduce the inaccuracies introduced by such environmental effects.

The above described travel time measurement technique for determining formation slowness suffers from other shortfalls as well. Existing methods provide only one-dimensional values of formation slowness along the borehole axis and discards valuable information inherent in the signal regarding properties of the formation in other directions such as radial and/or azimuthal directions that are perpendicular to the borehole axis.

To overcome the difficulty in assessing the slowness distribution in both the axial and radial directions, a travel time tomographic inversion (namely "tomography") can be employed. The aim of a travel time tomographic inversion is to find a solution or a model (i.e. formation slowness distribution along and around a borehole) that minimizes the discrepancy between measured travel times and calculated ones at all source-receiver pairs. The governing equation of travel time tomography is generally non-linear but can be solved by an iterative solution algorithm starting with an initial model. At each iteration of this solution process, the following two steps are executed: forward modeling and inversion. By "forward modeling", the travel time is calculated for each source and receiver pair with a given model (from either an initial guess or the result of the previous iteration). However, since the model used is unlikely to be the true subsurface model, the calculated travel times are typically not consistent with the actual measured travel times. Hence, followed by this "forward modeling" step, the discrepancy between the actual measured and the calculated travel times is calculated and then minimized by an optimization/minimization method (e.g. a back-projection or conjugate-gradient) to update/adjust the previous resultant model. These two steps are conducted iteratively until a best fit is achieved (i.e. the travel time errors converge). Thus, the final solution model is obtained. A successful tomography depends strongly on these forward-modeling and inversion steps. As to each of these two steps, the numerical method used for the forward modeling is more critical and essential. It can be easily understood that an inaccurate and less robust modeling will generate incorrect travel times hence result in a wrong final solution.

U.S. Pat. No. 5,081,611 (B. Hornby, 1992) proposed such a tomography method based on inversion of travel times measured by a sonic tool. Hornby alleges that his method is able to determine slowness distributions away from the borehole. The method disclosed by Hornby, however, is not in frequent use, presumably because the modeling kernel based on a ray tracing technique for refraction waves is unreliable. In addition, the Hornby method requires implicitly imposed virtual layers along the borehole axis, which lacks robustness regarding prior information and geological support. Furthermore, the method taught by Hornby is limited to only two dimensions, i.e. along borehole axis and one of the radial directions.

As described previously, the modeling is a required step in this tomographic inversion and its robustness and efficiency is crucial to the success of the inversion. Although ray tracing is a well know numerical simulation technique and widely used in acoustic domain for travel time computations, there are numerous limitations of this method preventing its robust use for sonic tomography. For instance, ray tracing techniques assume the frequency of the sonic waves is infinitely high. Actual waves, however, frequently are band-limited. The propagation of actual waves is affected not only by the structures along the ray path as the ray approximation implies, but also by media in the vicinity of the ray path. For sonic waves, where the wavelength is not vastly smaller than the distance between a source and receivers, such a ray approximation is not accurate enough. Further, ray tracing computation is expensive, unstable and practically difficult to apply to a three-dimensional (3-D) tomography.

The present invention is directed to overcoming, or at least reducing the effects of, one or more of the problems outlined above.

SUMMARY OF THE INVENTION

The present invention meets the above-described needs and others. Specifically, the present invention provides a method of determining formation slowness of segments traversed by a borehole including generating acoustic waves with a sonic tool having a source and at least one receiver, and calculating a Fresnel volume wave path for the acoustic waves.

The present invention also provides a method of determining 3-D formation slowness about a borehole from data of a sonic tool having a sonic source and a plurality of receivers including assigning an initial slowness model for the formation and the borehole, calculating Fresnel volume (s) representing wave propagation path(s), calculating theoretical first arrival time(s) based on the Fresnel volume wave propagation path for each receiver, calculating a function of a measured first arrival time and the theoretical first arrival time for each receiver, the measured first arrival time for each receiver being determined from data of the sonic tool, back projecting the function along the Fresnel volume wave path of first arrival, thereby providing modifications to the initial slowness model for a plurality of formation segments, and modifying the initial slowness model as a function of the provided modifications.

Another aspect provides a method of determining formation slowness of segments traversed by a borehole including applying Fresnel zone tomography to sonic data.

The present invention also provides a formation slowness determination apparatus including a sonic source, a sonic receiver, and a processor coupled to the sonic source and sonic receiver and programmed to calculate and update a Fresnel zone for sonic waves generated by the sonic source and received by the sonic receiver.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The accompanying drawings illustrate preferred embodiments of the present invention and are a part of the specification. Together with the following description, the drawings demonstrate and explain the principles of the present invention.

FIG. 3b is diagram of the first arrival ray paths for the four-layered medium of FIG. 3a.

FIG. 6a is a slowness profile of the hypothetical formation for a computer simulation.

FIG. 6b is an estimated slowness profile inverted from synthetic traveltimes computed for the hypothetical formation.

FIG. 6c shows variations of the percentage difference between observed traveltime on the hypothetical slowness field and traveltimes computed on the reconstructed slowness field.

Throughout the drawings, identical elements are designated by identical reference numbers.

DETAILED DESCRIPTION OF THE PREFERRED EMBODIMENTS

Figure 1:
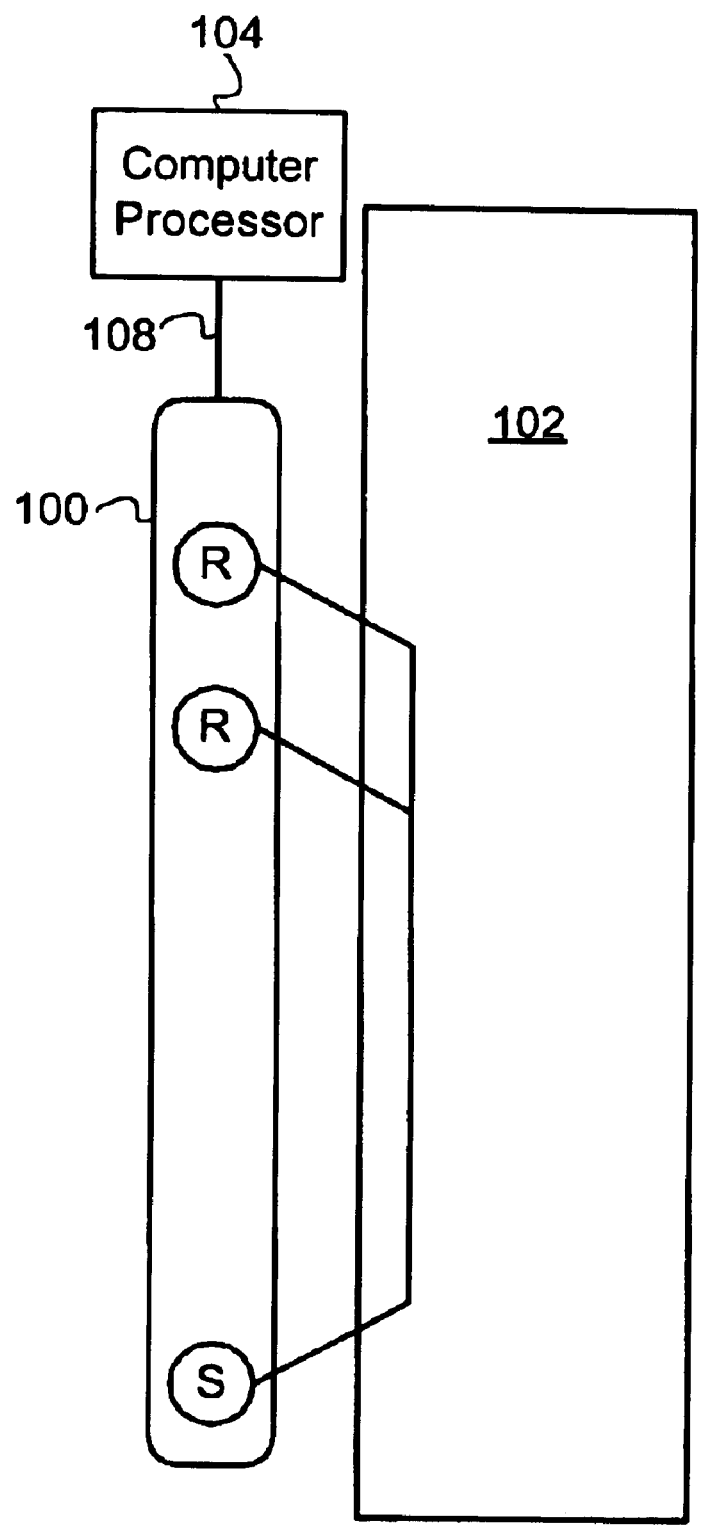
FIG. 1 is a representative view of a sonic tool coupled to a computer processor according to one embodiment of the present invention.

Turning now to the figures, and in particular to FIG. 1, a sonic tool (100) is shown adjacent to a homogeneous formation (102). The sonic tool (100) includes a source (S), and at least one receiver (R). In the present embodiment there are two receivers (R), however, many more receivers (R) and sources (S) may also be used. The one source (S), two receiver (R) arrangement shown is exemplary in nature and there may be a full array of receivers and/or sources. The receivers (R) and source (S) are coupled to a computer processor (104) for collecting and processing data from the sonic tool (100). Also shown is a wave ray path (106) representing a path for a compressional wave caused by activation of the source (S). The receivers and (R) may be of different types, including, but not limited to, piezoelectric and magneto-restrictive receivers. The receivers (R) are able to detect the arrival of sonic waves.

Information or data collected from the sonic tool (100), which may include waveforms generated by the receivers (R) over time, is sent to the computer processor (104) via a cable (108) from which the sonic tool (100) is suspended or by any other convenient communication technique. The computer processor (104) is commercially available from a wide variety of sources. The sonic data taken by the sonic tool (100) and received by the computer processor (104) may be processed implementing a Fresnel volume approach (described below) to determine formation slowness according to a method of the present invention. The calculation of formation slowness may be performed by the computer processor (104) at the well-site, or the computations may be done at an off-site processing location using the sonic data collected by the sonic tool (100). In addition, according to some methods of the present invention, the calculation of formation slowness implementing the Fresnel volume approach may be done in real-time by the computer processor (104).

Figure 2:
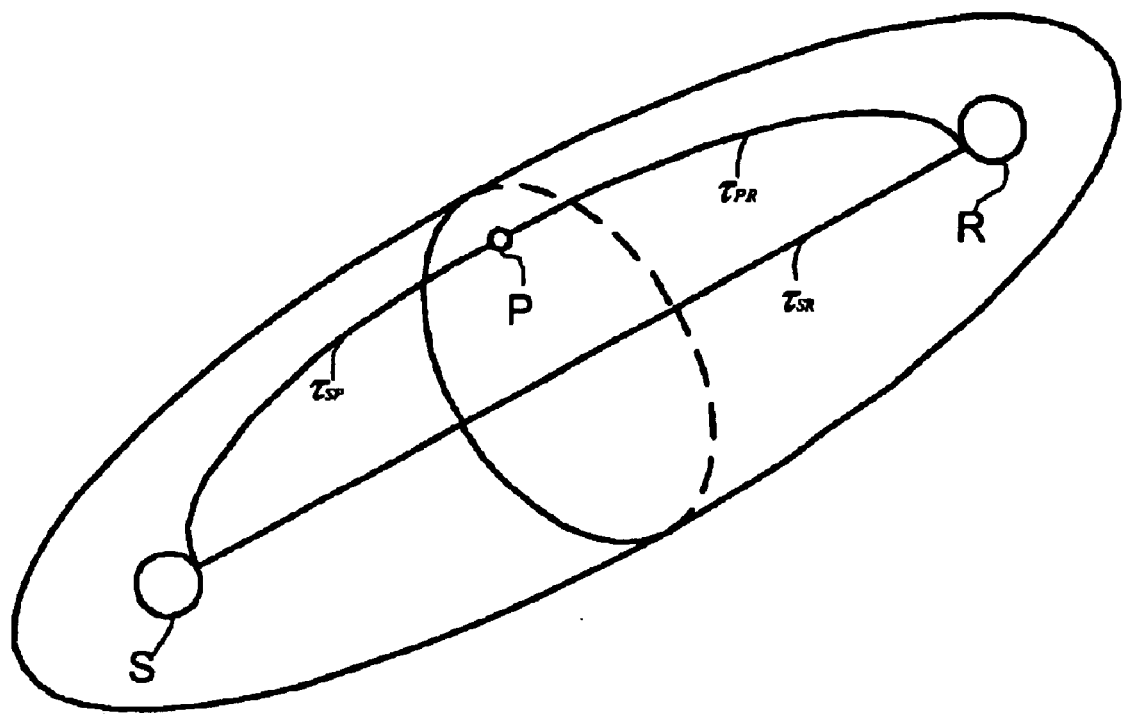
FIG. 2 is a schematic representation of a Fresnel volume corresponding to a source and receiver.

Turning next to FIG. 2, a schematic representation of a Fresnel volume (200) is shown. The Fresnel volume (200) approach for processing sonic data may be implemented according to one embodiment of the present invention to determine formation slowness. The Fresnel volume (200) corresponding to a sonic source (S) and a receiver (R) is represented by a point (P) that satisfies the following equation:

$$\Delta \tau = \tau_{SP} + \tau_{RP} - \tau_{SR} \leq \frac{1}{2f} \quad (1)$$

where $\tau_{sp}$ is the travel time from the source (S) to the considering point (P), $\tau_{RP}$ is the travel time from the receiver (R) to the considering point (P), $\tau_{SR}$ is the shortest travel time from the source (S) to the receiver (R), and f is frequency of acoustic waves (1/f is the period).

Therefore, the Fresnel volume or zone (200) may be described as many possible rays (rays are lines perpendicular to wave fronts) delayed in time by half a period or less. The implementation of the Fresnel volume (200) advantageously eliminates the need for ray tracing techniques of the prior art that are difficult to implement and practically limited to 2-D tomography. The exact ray does not need to be traced because it is included implicitly in the Fresnel volume (200).

Estimation of the Fresnel volume (200) may be implemented according to the present invention by Vidale's method (Vidale, 1988), which includes solving an Eikonal equation by a finite difference approximation. More particularly, determining the Fresnel zone (200) according to one method of the present invention includes the integration of wave theory, the reciprocity theorem, and Fermat's principle. Wave propagation theory holds for reciprocity, i.e.

travel times to and from the receiver (R) and the consideration point (P) are equal ($\tau_{RP}=\tau_{PR}$). Fermat's principle states that the path of a ray of light between two points is the path that minimizes travel time. Fermat's principle also holds for sound waves.

Therefore, the Fresnel Zone may be obtained according to one embodiment of the present invention by calculating wave travel times for a whole space, for example the cell (202), summing the travel times between both the receiver (R) and the consideration point (P) and the source (S) and the consideration point (P) ($\tau_{RP}+\tau_{SP}$), subtracting the travel time between the source (S) and the receiver (R) ($\tau_{SR}$) from the sum ($\tau_{RP}+\tau_{SP}-\tau_{SR}$), and finding the zone where equation (1) is satisfied. This zone is the Fresnel zone (200) by definition and is a robust "ray tracing" technique because the algorithm does not find an exact ray path.

However, the paths defined by the Fresnel zone (200) may be rectified with weigh values at individual grid points. To rectify the paths with weigh values, an appropriate weighting function is selected. For example, an exponential weight value may be selected which decreases from 1 to 0 exponentially as the time travel delay measured increases according to the following equation:

$$w = \begin{cases} \exp(-(2f\Delta t)^2), & \left(\Delta t \leq \frac{1}{2f}\right) \\ 0, & \left(\Delta t > \frac{1}{2f}\right) \end{cases} \quad (2)$$

where $\Delta t = \tau_{SP}+\tau_{RP}-\tau_{SR}$

Figure 3A:
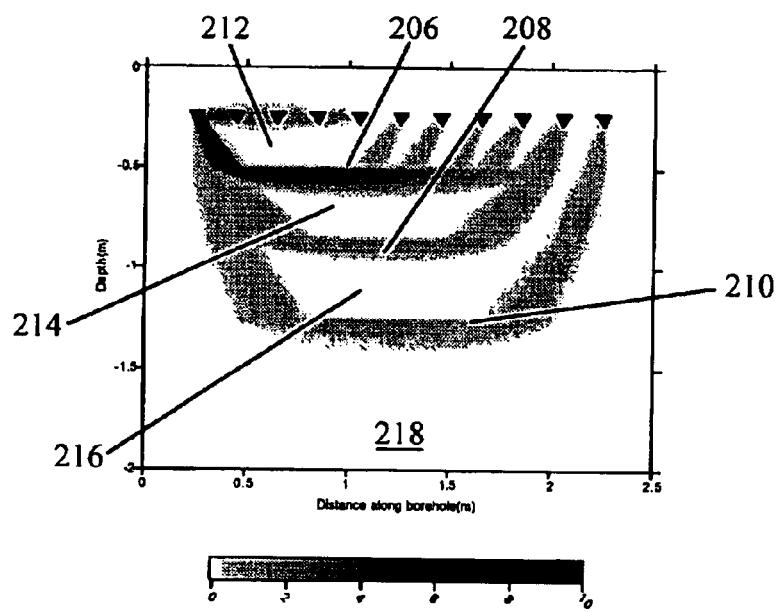
FIG. 3a is an example of a Fresnel volume head wave in a four-layered medium according to one embodiment of the present invention.
Figure 3B:
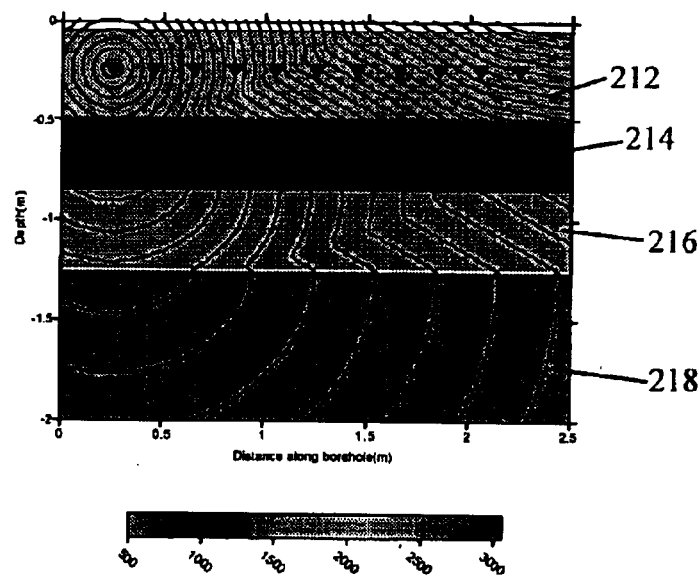

FIG. 3a shows an example of a Fresnel volume of head waves represented as weight values using the weighting function of equation (2). The figure shows multiple Fresnel zones (206, 208, and 210) indicating multiple layers (212, 214, 216, 218) in a formation. Similarly, FIG. 3b shows the first arrival ray paths to multiple receivers for one source position for the four-layer formation. The refracted waves from the second (214), third (216), and fourth (218) layers can be seen clearly in FIG. 3b.

The Fresnel volume tomography is different from standard tomographic techniques based on the exact ray tracing where a single ray path is considered. With Fresnel volume tomography, a ray path is considered as a beam, not as a single line. These ray paths are embodied by the weight values on the grid. Accordingly, the weight values are included in the tomographic inversion kernel. The travel time from a source to a receiver with a high frequency approximation can be expressed by an integral equation:

$$t_k = \int_{T_k(r)} s(r)dr \quad (3)$$

where, $T_k(r)$ denotes k-th ray path, s(r) the slowness of the grid and dr the arc length. Including the weight values w(r) implemented here, the equation is rewritten as:

$$t_k = \int_{Raypath} w(r)s(r)dr \quad (4)$$

By selecting an appropriate weighting function, Fresnel volume can represent the wave propagation with finite frequency derived from the wave theory. The advantage of the Fresnel volume approach is that it does not require the high computation time compared with other approaches based on wave theory. The Fresnel volume approach is intermediate to the ray approximation and the wave theory.

According to full-wave inversion based on the acoustic wave equation the error function to be minimized is defined as the total power of the residuals of the waveform. The gradient of the error function with respect to the velocity is calculated by correlating the forward-propagated wavefield and the backward-propagated wavefield of the residuals. By selecting an appropriate weighting function, Fresnel volume can represent the wave propagation with finite frequency derived from the wave theory. The advantage of the Fresnel volume approach is that it does not require the high computation time compared with other approaches based on wave theory. The Fresnel volume approach is intermediate to the ray approximation and the wave theory.

As discussed, the Fresnel zone wave path is calculated by simple secondary travel time calculations and expressed by weight values on a grid. The Fresnel zone may next be inverted to reconstruct a slowness field grid on the same grid as that used to calculate travel time and the Fresnel volumes. For example, in a homogeneous slowness field S, with T as the travel time for a source and receiver pair spaced from each other by a distance of L, the relation between the slowness and the travel time can be described mathematically as:

$$\frac{T}{S} = L, \quad (3)$$

$$T\frac{\delta TS - T\delta S}{S^2} = 0,$$

$$\frac{\Delta S}{S} = \frac{\Delta T}{T}$$

The updated slowness, $\Delta S_p^k$ of the p-th grid point on the k-th iteration, and the travel time error $\Delta T_i$ of the i-th rays are expressed by:

$$\Delta T_i = T_i^{obs} - T_i^{cal} \text{ and}$$

$$\Delta S_p^k = S_p^{k+1} - S_p^k \quad (4)$$

where $T^{obs}$ and $T^{cal}$ are the observed travel time and the calculated travel time with respect to a current model.

If $S_p^{k+1}$ is assigned to be a true slowness value $S_p^{true}$, and by Eq. (4), a relationship between the slowness and the travel time related to the weight values of each grid point can be obtained as follows:

$$\frac{\Delta S_p^k}{S_p^{k+1}} = w_{pi} \frac{\Delta T_i}{T_i^{obs}} \quad (5)$$

where $w_{pi}$ is the weight values on each grid point calculated by Equation (2). Considering all the rays, the updated slowness for each grid point can be expressed as:

$$\frac{\Delta S_p^k}{S_p^{k+1}} = \sum_i w_{pi} \frac{\Delta T_i}{T_i^{obs}} / \sum_i w_{pi} \quad (6)$$

Finally, from equations (4) and (6), an updating parameter is derived as:

$$S_p^{k+1} = \frac{S_p^k}{1 - \alpha_{pik}} \quad \text{where} \quad (7)$$

-continued $$\alpha_{pik} = \sum_i w_{pi} \frac{\Delta T_i}{T_i^{obs}} / \sum_i w_{pi}$$

Figure 4:
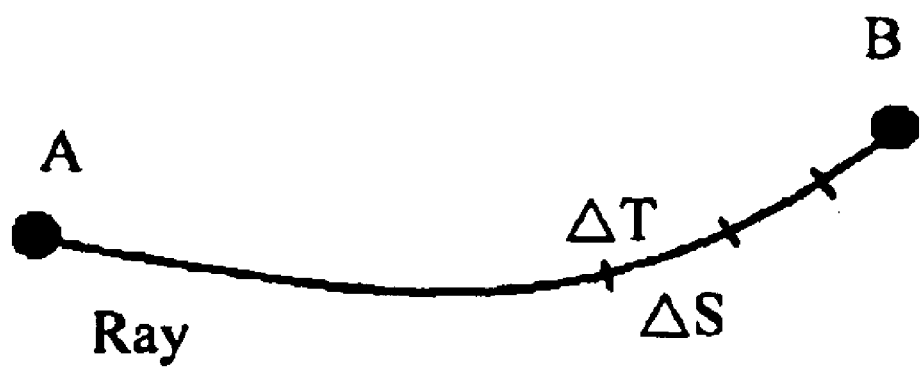
FIG. 4 is diagrammatical explanation of a reconstruction algorithm according to one embodiment of the present invention.

Equation (7) is an expansion of an ordinary simultaneous iterative reconstruction technique (SIRT) applied to a Fresnel zone where the slowness is updated after all ray paths are considered. FIG. 4 displays an explanation of a reconstruction algorithm such as the one detailed above. The SIRT is one suitable back-projector method; it is understood that other back-projector may be used.

The Fresnel zone tomography method was originally developed in seismic applications (e.g. Watanabe et al. 1999), however, the Fresnel zone method is adapted according to the present invention for application to sonic data. Sonic data is usually acquired by a short source-receiver interspacing with several offsets covering hundreds of feet of borehole length. The reconstructed area, however, is just a few feet from the borehole. Accordingly, application of Fresnel zone tomography to sonic data may include particular adaptations according to the present invention.

Figure 5:
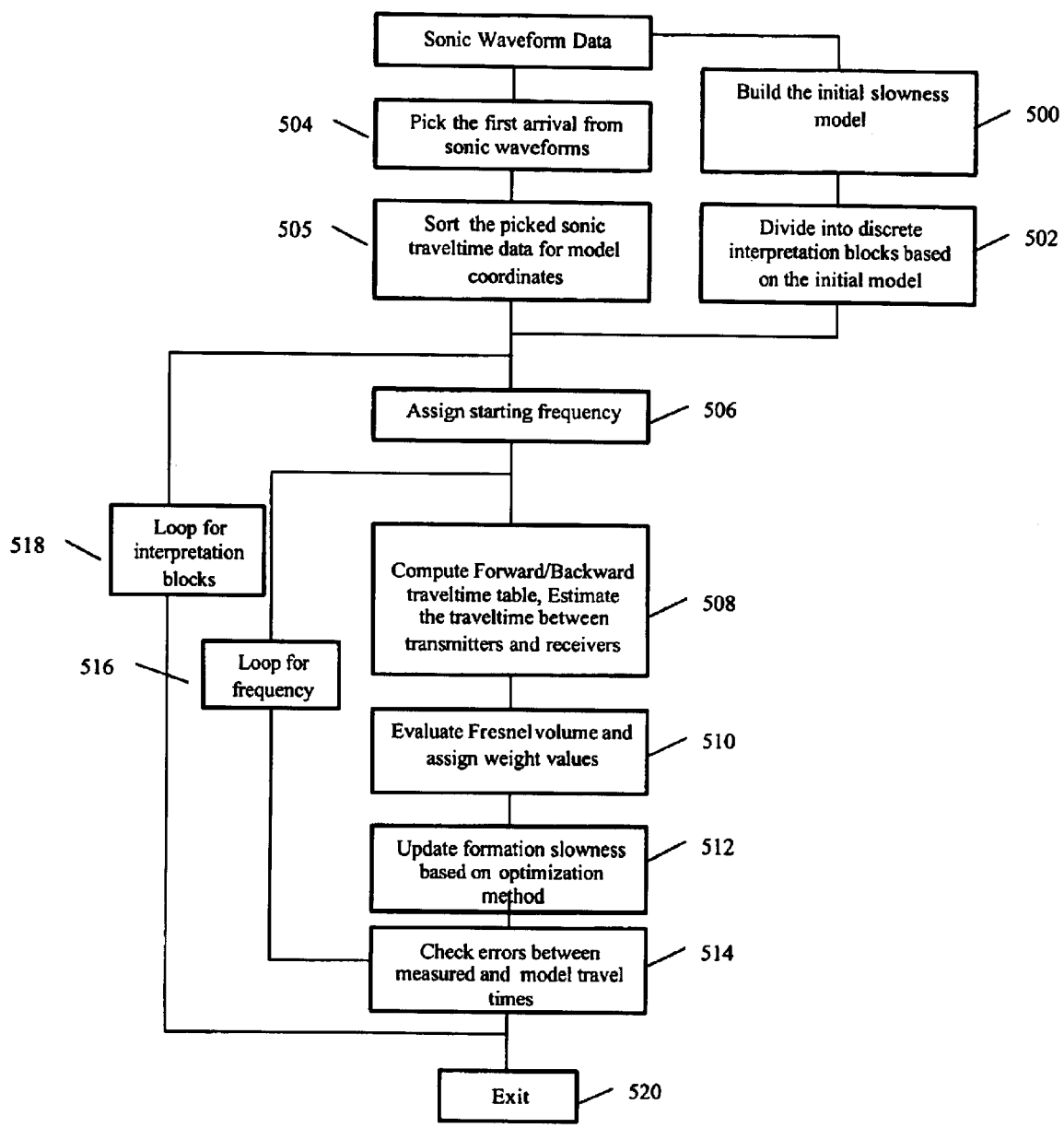
FIG. 5 shows a flowchart for determining formation slowness according to one aspect of the present invention.

According to one method of the present invention, applying Fresnel zone tomography to sonic data may include assigning an initial layered slowness model to a formation. The calculation of slowness using Fresnel zone tomography is an iterative process as discussed above, so a "best guess" model may be assigned based on semblance analysis of the sonic data and using caliper log data (if available). However, the iterative process for determining slowness using Fresnel zones is stable and therefore more tolerant to an inaccurate initial model. FIG. 5 illustrates one method of slowness calculation using Fresnel zone tomography according to the present invention.

The initial slowness model (500) may be built by delta-t processing and using caliper log information. The model may be expressed on a coordinate grid, and the slowness computation method may further include assigning corresponding coordinates from the model coordinate grid to sonic travel time data collected by the sonic tool (100, FIG. 1) as detailed in blocks (504 and 505). To create the model coordinate grid, first arrival signals are chosen from sonic waveforms (504) and the chosen sonic traveltime data may then be sorted for model coordinates (505). The coordinate grid may be divided into discrete interpretation blocks (502) based on the initial model (500), preferably such that the block contains a homogeneous segment of the formation. A relatively small interpretation block allows a more convenient application of the inversion process. In addition, a starting frequency filter band may be assigned (506).

The Fresnel volume may then be evaluated by a forward/backward computation (508) of the travel times as discussed above, followed by an inversion reconstruction of formation slowness according to a back-projection approach (also discussed above). In order to overcome the extreme length-to-width ratio of sonic data, according to one method of the present invention, a rectangular element may be adopted for the forward travel time calculation. Calculation of the travel times for rectangular grids may, for example, be done with the fast-marching method or the linear traveltime interpolation method. The fast-marching method has been recently developed by Sethian (1996) for analyzing and computing interface motion in a host of settings. This algorithm is fast and applicable to general geometry while preserving practical accuracies.

Key points of the fast-marching method may include the following: building the solution of the eikonal equation outward from the smallest travel-time values, stepping away from the boundary condition in a downwind direction, and recomputing the travel-time values at downwind neighboring points, which cannot yield a value smaller than any of the known points. Using this method, there is no need to go back and revisit a point with a known value, because known values remain unchanged by all later calculations.

In addition, the evaluation of the Fresnel volume includes assigning weight values (510) as discussed above, updating formation slowness based on back-projection (512), and then checking the errors between the measured and model traveltimes (514). Based on the errors measured, the frequency filter band is adjusted and reassigned (516), as are the interpretation blocks (518); and the slowness is iteratively evaluated by repeating the steps represented by boxes (508–514) until the errors converge. When the errors converge, the method terminated (520).

The reconstructed slowness tomograms using a back-projection approach can also be applied with a three-dimensional tomogram configuration. In order to facilitate three-dimensional reconstruction, an eikonal solver may be used. A cylindrical eikonal solver is useful as sonic data is measured around a borehole. The fast-marching method was implemented by prior art in Cartesian and spherical coordinates. This invention has extended the formulation of the fast-marching method in 3-D cylindrical coordinates. The formulation is described below.

3-D Cylindrical Eikonal Solver

The following describes the formulation of the eikonal equation in cylindrical coordinates based on a fast-marching algorithm. The eikonal solvers are examples of how to solve the mathematical expressions used according to some aspects of the invention, however, other method of solving the mathematics involved may also be used. The expression of the eikonal equation in cylindrical coordinates is:

$$\left(\frac{\partial T}{\partial r}\right)^2 + \frac{1}{r^2}\left(\frac{\partial T}{\partial \theta}\right)^2 + \left(\frac{\partial T}{\partial z}\right)^2 = s(r, \theta, z)^2 \tag{8}$$

However, the computation logic changes for different cases as described below.

General Case 1: The point to be computed has six neighbors, two in each direction First, the spatial forward and backward derivative operators are defined as:

$$D_{ijk}^{-r} = \frac{T_{ijk} - T_{i-1,j,k}}{\Delta r}, \quad D_{ijk}^{+r} = \frac{T_{1+i,j,k} - T_{ijk}}{\Delta r}$$

$$D_{ijk}^{-\theta} = \frac{T_{ijk} - T_{i,j-1,k}}{r\Delta\theta}, \quad D_{ijk}^{+\theta} = \frac{T_{i,j+1,k} - T_{ijk}}{r\Delta\theta}$$

$$D_{ijk}^{-z} = \frac{T_{ijk} - T_{i,j,k-1}}{\Delta z}, \quad D_{ijk}^{+z} = \frac{T_{i,j,k+1} - T_{ijk}}{\Delta z}$$

Thus, the eikonal equation can be approximated by the following formula:

$$\max(D_{ijk}^{-r}, -D_{ijk}^{+r}, 0)^2 + \max(D_{ijk}^{-\theta}, -D_{ijk}^{+\theta}, 0)^2 + \max(D_{ijk}^{-z}, -D_{ijk}^{+z}, 0)^2 = s_{ijk}^2 \tag{9}$$

In one given direction, if the two neighbors have already been computed, the one with the minimum value will appear in the eikonal equation approximation. If only one neighbor is known, the other one is infinite, and thus, only the known value will appear in the eikonal equation approximation. If neither of the neighbors has been computed, they have both an infinite value, and thus, the corresponding term will disappear in the eikonal equation approximation.

Case 1a—One point at least in each direction has already been computed

To solve this equation, the following notations are chosen:

$$T_{min,I} = \min(T_{i-1,j,k}; T_{i+1,j,k})$$

$$T_{min,J} = \min(T_{i,j-1,k}; T_{i,j+1,k})$$

$$T_{min,K} = \min(T_{i,j,k-1}; T_{i,j,k+1})$$

Thus, the eikonal equation can be written:

$$\left(\frac{T_{ijk} - T_{min,I}}{\Delta r}\right)^2 + \left(\frac{T_{ijk} - T_{min,J}}{r\Delta\theta}\right)^2 + \left(\frac{T_{ijk} - T_{min,J}}{\Delta z}\right)^2 = s_{ijk}^2 \quad (10)$$

Which leads to the quadratic equation (11):

$$T_{ijk}^2\left(\frac{1}{\Delta r^2} + \frac{1}{r^2\Delta\theta^2} + \frac{1}{\Delta z^2}\right) -$$

$$2T_{ijk}\left(\frac{T_{min,I}}{\Delta r^2} + \frac{T_{min,J}}{r^2\Delta\theta^2} + \frac{T_{min,K}}{\Delta z^2}\right) + \frac{T_{min,I}^2}{\Delta r^2} + \frac{T_{min,J}^2}{r^2\Delta\theta^2} + \frac{T_{min,K}^2}{\Delta z^2} - s_{ijk}^2 = 0$$

and we have:

$$\Delta = \frac{4}{r^2\Delta r^2\Delta\theta^2\Delta z^2}[s_{ijk}^2(r^2\Delta\theta^2\Delta z^2 + \Delta r^2\Delta z^2 + r^2\Delta r^2\Delta\theta^2)] -$$

$$\frac{4}{r^2\Delta r^2\Delta\theta^2\Delta z^2}(r^2\Delta\theta^2[T_{min,I} - T_{min,J}]^2 +$$

$$\Delta r^2[T_{min,J} - T_{min,K}]^2 + \Delta z^2[T_{min,I} - T_{min,J}]^2)$$

Taking the solution that yields a traveltime greater than the ones already computed:

$$T_{ijk} = \frac{1}{r^2\Delta\theta^2\Delta z^2 + \Delta r^2\Delta z^2 + r^2\Delta r^2\Delta\theta^2}\left[\left(r^2\Delta\theta^2\Delta z^2 T_{min,I} + \right.\right. \quad (11)$$

$$\Delta r^2\Delta z^2 T_{min,J} + r^2\Delta r^2\Delta\theta^2 T_{min,K}\right) +$$

$$r\Delta r\Delta\theta\Delta z\left[s_{ijk}^2(r^2\Delta\theta^2\Delta z^2 + \Delta r^2\Delta z^2 + r^2\Delta r^2\Delta\theta^2) - \right.$$

$$\left(r^2\Delta\theta^2(T_{min,K} - T_{min,I})^2 + \right.$$

$$\left.\left.\left.\Delta r^2(T_{min,J} - T_{min,K})^2 + \Delta z^2(T_{min,I} - T_{min,J})^2\right)\right]^{\frac{1}{2}}\right]$$

And use the following notations:

$$T = \begin{bmatrix} T_{min,I} \\ T_{min,J} \\ T_{min,K} \end{bmatrix}, \quad \Delta = \begin{bmatrix} \Delta r \\ r\Delta\theta \\ \Delta z \end{bmatrix} = \begin{bmatrix} \Delta r \\ i\Delta r\Delta\theta \\ \Delta z \end{bmatrix},$$

$$\Delta 2 = \begin{bmatrix} \Delta r^2 \\ i^2\Delta r^2\Delta\theta^2 \\ \Delta z^2 \end{bmatrix}, \quad \Delta 3 = \begin{bmatrix} \Delta 2[2]\cdot\Delta 2[3] \\ \Delta 2[1]\cdot\Delta 2[3] \\ \Delta 2[2]\cdot\Delta 2[1] \end{bmatrix}$$

Yields equation (12) below:

$$T_{ijk} = \frac{T^+\cdot\Delta 3}{\sum_{i=1}^{3}\Delta 3[i]} + \frac{\Delta[1]\cdot\Delta[2]\cdot\Delta[3]}{\sum_{i=1}^{3}\Delta 3[i]} \cdot$$

$$\sqrt{s_{ijk}^2 \cdot \sum_{i=1}^{3}\Delta 3[i] - [\Delta 2[2](T[3] - T[1])^2 + \Delta 2[1](T[2] - T[3])^2 + \Delta 2[3](T[2] - T[1])^2]}$$

Case 1b—In one direction, the two neighboring points are unknown

In one direction with two neighboring points unknown, we have only two minimums that will appear in the approximation of the eikonal equation. Identifying the two minimums $T_1$ and $T_2$, $\Delta_1$ and $\Delta_2$ are the corresponding grid spacings (grid spacing in the direction were at least one neighbor has already been computed. The approximation of the eikonal equation is thus the following:

$$\left(\frac{T_{ijk} - T_1}{\Delta_1}\right)^2 + \left(\frac{T_{ijk} - T_2}{\Delta_2}\right)^2 = s_{ijk}^2$$

This leads to the quadratic equation:

$$T_{ijk}^2\left[\frac{1}{\Delta_1^2} + \frac{1}{\Delta_2^2}\right] - 2T_{ijk}\left[\frac{T_1}{\Delta_1^2} + \frac{T_2}{\Delta_2^2}\right] + \frac{T_1^2}{\Delta_1^2} + \frac{T_2^2}{\Delta_2^2} - s_{ijk}^2 = 0$$

$$\Delta = \frac{4}{\Delta_1^2\Delta_2^2}[s_{ijk}^2(\Delta_1^2 + \Delta_2^2) - (T_1 - T_2)^2]$$

And hence $$T_{ijk} = \frac{T_1\Delta_2^2 + T_2\Delta_1^2}{\Delta_1^2 + \Delta_2^2} + \frac{\Delta_1\Delta_2}{\Delta_1^2 + \Delta_2^2}\sqrt{s_{ijk}^2(\Delta_1^2 + \Delta_2^2) - (T_1 - T_2)^2} \quad (13)$$

Case 1c—In two directions, the two neighboring points are unknown

In the of two directions with the two neighboring points unknown, only one minimum travel time will appear in the eikonal equation. Calling T this minimum and $\Delta$ the corresponding grid spacing, the solution is trivial and yields the following result:

$$T_{ijk} = T + s_{ijk}\cdot\Delta \quad (14)$$

Case 2—Special case: The point to be computed is on the vertical axis on the cylindrical grid Case 2a—Neighbors on the vertical axis On the vertical axis, the position does not make any difference. So the neighbor with the smallest arrival time will be taken into consideration, just as it is in the general case.

Case 2b—Neighbors within the (r.θ) plane

Within the (r, θ) plane, the point to be computed has more than two neighbors. If the position of the point is (0, j,k) (j may take any value), the neighbors are the m points with coordinates (1, j, k) with j∈{1 . . . m}. Accordingly it is determined which point has the smallest arrival time value, and the smallest arrival time value is used to solve the eikonal equation approximation. Therefore, in the present case, only two members of the Eikonal Equation approximation will appear.

If $T_1$ is the minimum travel time in the vertical direction, and $T_2$ is the neighboring point in the (r,θ) plane with minimum travel time, then $\Delta_1$, would be $\Delta z$ and $\Delta_2$ would be $\Delta_r$. Thus, the eikonal equation approximation is written:

$$\left(\frac{T_{ijk}-T_1}{\Delta_1}\right)^2 + \left(\frac{T_{ijk}-T_2}{\Delta_2}\right)^2 = s_{ijk}^2$$

Which leads to the quadratic equation:

$$T_{ijk}^2\left[\frac{1}{\Delta_1^2}+\frac{1}{\Delta_2^2}\right] - 2T_{ijk}\left[\frac{T_1}{\Delta_1^2}+\frac{T_2}{\Delta_2^2}\right] + \frac{T_1^2}{\Delta_1^2}+\frac{T_2^2}{\Delta_2^2} - s_{ijk}^2 = 0$$

$$\Delta = \frac{4}{\Delta_1^2\Delta_2^2}[s_{ijk}^2(\Delta_1^2+\Delta_2^2)-(T_1-T_2)^2]$$

And hence $$\boxed{T_{ijk} = \frac{T_1\Delta_2^2+T_2\Delta_1^2}{\Delta_1^2+\Delta_2^2} + \frac{\Delta_1\Delta_2}{\Delta_1^2+\Delta_2^2}\sqrt{s_{ijk}^2(\Delta_1^2+\Delta_2^2)-(T_1-T_2)^2}}$$

According to one method of the present invention, tool orientation algorithms may identify source (S) and receiver (R) positions and combine the position information with tomography inversions for creation of three-dimensional slowness tomograms.

Using the method described above, a computer simulation may be carried out for 3-D tomography. For example, an experimental trial has been run as described below. A hypothetical formation having a borehole, a damaged zone in the formation, and a virgin formation was provided. FIG. 6a, is a slowness plot of the hypothetical formation. Investigation of the hypothetical formation was conducted with a simulated tool having eight receivers azimuthally positioned at every 45 degrees with thirteen levels located axially six inches apart, at distances from twelve to eighteen feet from a source. With such a tool, simulated traveltimes were computed by the 3-D cylindrical eikonal solver. The traveltimes obtained at receiver positions were input to the tomography processing to invert the slowness profile. The results of the reconstruction of the slowness of the hypothetical formation are shown in FIG. 6b.

FIG. 6c shows variations of the percentage difference between observed traveltime on the hypothetical slowness field and traveltimes computed on the reconstructed slowness field. After forty iterations, the difference between the observed and calculated travel times was about three percent. A comparison of FIG. 6a and FIG. 6b, demonstrates the method successfully recovered the slowness profile for the hypothetical formation.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of determining formation slowness of segments traversed by a borehole comprising:
generating acoustic waves with a sonic tool having a source and at least one receiver; and
calculating a Fresnel volume wave path for the acoustic waves, wherein an initial model is assigned for the Fresnel volume wave path, the initial model being non-homogeneous at least in the direction of the axis of the borehole.

2. The method of claim 1, wherein the initial model assigned to the Fresnel volume wave path is an initial layered model.

3. The method of claim 2, wherein said initial layered model is generated by slowness analysis and using caliper log data.

4. The method of claim 2, further comprising assigning corresponding coordinates of the initial layered model to sonic travel time data.

5. The method of claim 4, further comprising dividing the coordinates into interpretation blocks.

6. The method of claim 1, further comprising performing a forward computation of travel times to evaluate the Fresnel volume.

7. The method of claim 6, further comprising solving an eikonal equation by a finite difference approximation.

8. The method of claim 7, further comprising adopting a rectangular element for the forward computation of travel times.

9. The method of claim 7, further comprising adopting an eikonal solver for calculating travel times for 2-D tomography.

10. The method of claim 9, wherein the eikonal solver is performed by a fast-marching method or a liner travel time interpolation method.

11. The method of claim 7, further comprising solving an eikonal equation by a fast-marching method in cylindrical coordinates for 3-D tomography.

12. The method of claim 7, further comprising:
calculating travel times for a whole space;
adding travel times from the source and receiver positions to a considering point;
subtracting a smallest travel time from the source to the receiver, and
finding a zone where the addition of the travel times from the source and receiver positions to the considering point minus the smallest travel time from the source to the receiver is less than or equal to one-half of a wave period.

13. The method of claim 1, further comprising reconstructing the formation slowness by an optimization method.

14. The method of claim 13, wherein said optimization method comprises back-projection.

15. The method of claim 13, wherein Fresnel zone wave path is expressed by weight values on coordinates.

16. The method of claim 13, wherein the reconstructing comprises a simultaneous iterative reconstruction technique algorithm.

17. The method of claim 13, further comprising updating reconstructed tomograms of formation slowness.

18. The method of claim 17, further comprising dividing the reconstructed tomograms into a plurality of blocks.

19. The method of claim 18, further comprising adopting a cylindrical eikonal solver for reconstructing the tomogram in 3-D.

20. The method of claim 19, further comprising identifying source and receiver positions with tool orientation algorithms and combining the positions with the reconstructed tomograms.

21. A method of determining formation slowness of segments traversed by a borehole from data of a sonic tool having a sonic source and a plurality of receivers comprising:

a) assigning an initial slowness model for the formation and the bore hole the initial model being non-homogeneous at least in the direction of the axis of the borehole;

b) calculating Fresnel volume(s) representing wave propagation path(s);

c) calculating theoretical first arrival time(s) based an the Fresnel volume wave propagation path for each receiver;

d) calculating a function of a measured first arrival time and the theoretical first arrival time for each receiver, the measured first arrival time for each receiver being determined from data of the sonic tool;

e) back projecting the function along the Fresnel volume wave path of first arrival, thereby providing modifications to the initial slowness model for a plurality of formation segments; and f) modifying the initial slowness model as a function of the provided modifications.

22. The method of claim 21, further comprising repeating steps b) through f) one or more times, wherein the slowness model used to calculate Fresnel volume(s) in step b) and in computing theoretical first arrival time(s) in step c) are modified slowness models based on results from step f) rather than initial slowness values; and wherein the theoretical first arrival time(s) of step c) and the function of step d) are modified accordingly.

23. The method of claim 21, wherein the data of the sonic tool is collected at a plurality of tool positions in the borehole.

24. The method of claim 21, wherein the initial slowness model is based on semblance analysis and caliper log data.

25. The method of claim 21, wherein the calculating of the Fresnel volume(s) further comprises a forward computation of travel times.

26. The method of claim 25, further comprising adopting a rectangular element for the forward computation of travel times.

27. The method of claim 26, further comprising adopting an eikonal solver for calculating travel times.

28. The method of claim 27, wherein the eikonal solver is performed by a fast-marching method or a liner travel time interpolation method.

29. The method of claim 25, further comprising calculating travel times for a whole space;

adding travel times from the source and receiver positions to a considering point;

subtracting a smallest travel time from the source to the receiver; and finding a zone where the addition of the travel times from the source and receiver positions to the considering point minus the smallest travel time from the source to the receiver is less than or equal to one-half of a wave period.

30. A method of determining formation slowness about a borehole comprising applying Fresnel zone tomography to sonic data.

31. The method of claim 30, further comprising generating acoustic waves with a sonic source to produce the sonic data; and calculating a Fresnel volume wave path for the acoustic waves.

32. The method of claim 31, further comprising assigning an initial layered model for the Fresnel volume wave path.

33. The method of claim 32, further comprising assigning corresponding coordinates of the initial layered model to the sonic data.

34. The method of claim 33, further comprising dividing the coordinates into interpretation blocks.

35. The method of claim 34, further comprising performing a forward computation of sonic wave travel times to evaluate the Fresnel volume wave path.

36. The method of claim 35, further comprising adopting a rectangular element for the forward computation of travel times.

37. The method of claim 36, further comprising adopting a liner travel time interpolation method for calculating travel times.

38. The method of claim 34, further comprising calculating travel times for a whole space;

adding travel times from the source and receiver positions to a considering point;

subtracting a smallest travel time from the source to the receiver; and finding a zone where the addition of the travel times from the source and receiver positions to the considering point minus the smallest travel time from the source to the receiver is less than or equal to one-half of a wave period.

39. The method of claim 35, further comprising reconstructing the formation slowness by back-projection.

40. The method of claim 39, wherein Fresnel zone wave path is expressed by weight values on the coordinates.

41. The method of claim 39, further comprising assembling reconstructed tomograms of formation slowness.

42. A formation slowness determination apparatus comprising:

a sonic source;

a sonic receiver;

a processor coupled to said sonic source and sonic receiver and programmed to calculate and update a Fresnel zone for sonic waves generated by the sonic source and received by the sonic receiver in a borehole, wherein an initial model is assigned for a Fresnel volume wave path, the initial model being non-homogeneous at least in the direction of the axis of the borehole.

* * * * *